US008789126B1

(12) United States Patent  
Nijim et al.

(10) Patent No.: US 8,789,126 B1  
(45) Date of Patent: Jul. 22, 2014

(54) SYSTEM, METHOD AND DEVICE FOR SWAPPING DISPLAY CONFIGURATIONS BETWEEN VIEWING DEVICES

(75) Inventors: Yousef Wasef Nijim, Roswell, GA (US); Jay P. Langa, Cumming, GA (US); Daniel D. Lam, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 13/221,063

(22) Filed: Aug. 30, 2011

(51) Int. Cl.  
*H04N 7/173* (2011.01)

(52) U.S. Cl.  
USPC .............. 725/133; 725/110; 725/109; 725/46

(58) Field of Classification Search  
None  
See application file for complete search history.

(56) References Cited

U.S. PATENT DOCUMENTS

| | | | |
|---|---|---|---|
| 6,567,984 B1* | 5/2003 | Allport | 725/110 |
| 2003/0172380 A1* | 9/2003 | Kikinis | 725/39 |
| 2007/0011702 A1* | 1/2007 | Vaysman | 725/45 |
| 2007/0204302 A1* | 8/2007 | Calzone | 725/46 |
| 2007/0285502 A1* | 12/2007 | Yee | 348/14.08 |
| 2008/0209487 A1* | 8/2008 | Osann et al. | 725/109 |

* cited by examiner

*Primary Examiner* — Jefferey Harold  
*Assistant Examiner* — Samira Monshi  
(74) *Attorney, Agent, or Firm* — Merchant & Gould P.C.

(57) ABSTRACT

A system, method and device for swapping display configurations between viewing devices. The system allows for swapping channels back and forth between the TV and the media device. A user and devices associated with the user are registered with the system. A swap setup is configured by setting swap configuration information. Swap functionality is provided to the registered devices. A swap initiation signal is received at the registered devices and display configurations are swapped between the registered devices.

30 Claims, 8 Drawing Sheets

SYSTEM, METHOD AND DEVICE FOR SWAPPING DISPLAY CONFIGURATIONS BETWEEN VIEWING DEVICES

FIELD OF THE INVENTION

This disclosure relates in general cable television services network, and more particularly to swapping display configurations between viewing devices.

BACKGROUND

Currently, customers are allowed to view mosaic channels only from the Set-top box and the mosaic includes the tiling of a plurality of programs at the same time for display on the TV screen. These can offer interactivity in the form of virtual or enhanced iTV channels, and these applications can be customizable by the user. Examples include picture in picture feeds where several live minimized channel feeds are offered on a single screen to watch simultaneously.

Today customers are not allowed to personalize their viewing experiences by swapping the mosaics or channels between the TV screen and other media devices such as the Tablet device. However, having the capability this would provide flexibility in viewing different channels.

Accordingly, there is a need to swapping display configurations between viewing devices.

SUMMARY OF THE INVENTION

To overcome the limitations described above, and to overcome other limitations that will become apparent upon reading and understanding the present specification, embodiments for swapping display configurations between viewing devices are disclosed.

The above described problems are solved by allowing customers to view more than one channel by displaying the channel(s) on a media device such as a tablet and the other channel(s) on the W. It allows for swapping channels back and forth between the TV and the media device.

An embodiment includes a method for swapping display configurations between viewing devices. The method includes registering a user and devices associated with the user, configuring a swap setup by setting swap configuration information, providing swap functionality to the registered devices, receiving swap initiation signal at the registered devices and swapping display configurations between the registered devices.

In another embodiment, a system for swapping display configurations between viewing devices is disclosed. The system includes memory for storing data and a processor, coupled to the memory, the processor implementing a user interface screen, the user interface screen being presented to a user for registering a user and devices associated with the user, selecting viewing devices from the registered device of the user for associating swap functions thereto, setting a display configuration for the selected viewing devices, and configuring a swap setup by setting swap configuration information.

In another embodiment, a computer-readable storage medium including executable instructions which, when executed by a processor, provides for swapping display configurations between viewing devices, is disclosed. The computer readable medium includes instructions are executed by the processor for swapping display configurations between viewing devices by registering a user and devices associated with the user, configuring a swap setup by setting swap configuration information, providing swap functionality to the registered devices, receiving swap initiation signal at the registered devices and swapping display configurations between the registered devices.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Embodiments of the present invention are directed to swapping display configurations between viewing devices. For example, an interface may be provided in an interactive program guide for controlling the tiling and swapping channels or programs between a media device and a display device coupled to a set-top box.

Figure 1:
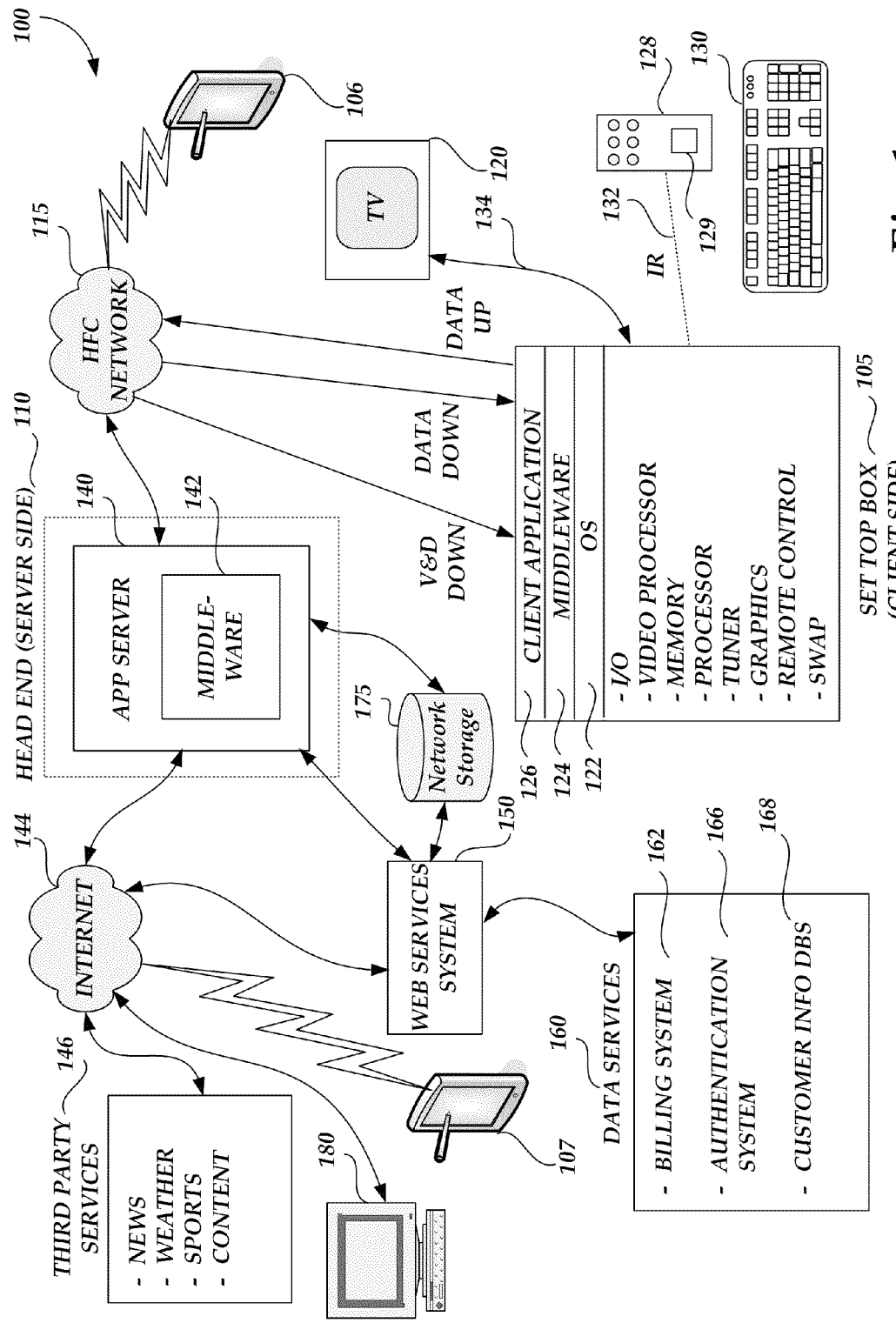
FIG. 1 is a simplified block diagram illustrating a cable television/services system (hereafter referred to as "CATV") architecture providing an operating environment according to an embodiment.

FIG. 1 is a simplified block diagram illustrating a cable television/services system 100 (hereafter referred to as "CATV") architecture providing an operating environment according to an embodiment. Referring now to FIG. 1, digital and analog video programming, information content and interactive television services are provided via a hybrid fiber coax (HFC) network 115 to a television set 120 for consumption by a cable television/services system customer. As is known to those skilled in the art, HFC networks 115 combine both optical fiber and coaxial cable lines. Typically, optical fiber runs from the cable head end 110 to neighborhoods of subscribers. Coaxial cable runs from the optical fiber feeders to each customer or subscriber. The functionality of the HFC network 115 allows for efficient bidirectional data flow between the client-side set-top box 105 and the server-side application server 140 of the embodiment.

The CATV system 100 is in the form of a distributed client-server computing system for providing video and data flow across the HFC network 115 between server-side services providers (e.g., cable television/services providers) via a server-side head end 110 and a client-side customer via a client-side set-top box (STB) 105 functionally connected to a customer receiving device, such as the television set 120. As is understood by those skilled in the art, modern CATV systems 100 may provide a variety of services across the HFC network 115 including traditional digital and analog video programming, telephone services, high speed Internet access, video-on-demand, and information services.

On the client side of the CATV system 100, digital and analog video programming and digital and analog data are provided to the customer television set 120 via the set-top box (STB) 105. Interactive television services that allow a customer to input data to the CATV system 100 likewise are provided by the STB 105. As illustrated in FIG. 1, the STB 105 is a multipurpose computing device having a computer processor, memory, and an input/output mechanism. The input/output mechanism receives input from server-side processes via the HFC network 115 and from customers via input devices such as the remote control device 128 and the keyboard 130. The remote control device 128 and the keyboard 130 may communicate with the STB 105 via a suitable communication transport such as the infrared connection 132. The remote control device 128 may include a biometric input module 129. The STB 105 also includes a video processor for processing and providing digital and analog video signaling to the television set 120 via a cable communication transport 134. A multi-channel tuner is provided for processing video and data to and from the STB 105 and the server-side head end system 110, described below.

The STB 105 also includes an operating system 122 for directing the functions of the STB 105 in conjunction with a variety of client applications 126. For example, if a client application 126 requires a news flash from a third-party news source to be displayed on the television 120, the operating system 122 may cause the graphics functionality and video processor of the STB 105, for example, to output the news flash to the television 120 at the direction of the client application 126 responsible for displaying news items.

Because a variety of different operating systems 122 may be utilized by a variety of different brands and types of set-top boxes, a middleware layer 124 is provided to allow a given software application to be executed by a variety of different operating systems. According to an embodiment, the middleware layer 124 may include a set of application programming interfaces (APIs) that are exposed to client applications 126 and operating systems 122 that allow the client applications to communicate with the operating systems through common data calls understood via the API set. As described below, a corresponding middleware layer is included on the server side of the CATV system 100 for facilitating communication between the server-side application server and the client-side STB 105. The middleware layer 142 of the server-side application server and the middleware layer 124 of the client-side STB 105 may format data passed between the client side and server side according to the Extensible Markup Language (XML).

The set-top box 105 passes digital and analog video and data signaling to the television 120 via a one-way communication transport 134. The STB 105 may receive video and data from the server side of the CATV system 100 via the HFC network 115 through a video/data downlink and data via a data downlink. The STB 105 may transmit data from the client side of the CATV system 100 to the server side of the CATV system 100 via the HFC network 115 via one data uplink. The video/data downlink is an "in band" downlink that allows for digital and analog video and data signaling from the server side of the CATV system 100 through the HFC network 115 to the set-top box 105 for use by the STB 105 and for distribution to the television set 120. As is understood by those skilled in the art, the "in band" signaling space operates at a relative high frequency, e.g., between 54 and 860 megahertz. The signaling space is generally divided into channels in which may be transmitted a single analog signal or a greater number (e.g., ten) of digital signals. At any given time, such analog signals represent programs provided via the channels. Herein, the terms channels and programs may sometimes be used interchangeably.

The data downlink and the data uplink, illustrated in FIG. 1, between the HFC network 115 and the set-top box 105 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 105 and the server-side application server 140 is typically passed through the "out of band" data links. Alternatively, an "in band" data carousel may be positioned in an "in band" channel into which a data feed may be processed from the server-side application server 140 through the HFC network 115 to the client-side STB 105. Operation of data transport between components of the CATV system 100, described with reference to FIG. 1, is well known to those skilled in the art.

Referring still to FIG. 1, the head end 110 of the CATV system 100 is positioned on the server side of the CATV system and includes hardware and software systems responsible for originating and managing content for distributing through the HFC network 115 to client-side STBs 105 for presentation to customers via televisions 120. As described above, a number of services may be provided by the CATV system 100, including digital and analog video programming, interactive television services, telephone services, video-on-demand services, targeted advertising, and provision of information content.

The application server 140 is a general-purpose computing system operative to assemble and manage data sent to and received from the client-side set-top box 105 via the HFC network 115. As described above with reference to the set-top box 105, the application server 140 includes a middleware layer 142 for processing and preparing data from the head end of the CATV system 100 for receipt and use by the client-side set-top box 105. For example, the application server 140 via the middleware layer 142 may obtain data from third-party services 146 via the Internet 140 for transmitting to a customer through the HFC network 115 and the set-top box 105. For example, a weather report from a third-party weather service may be downloaded by the application server via the Internet 144. When the application server 140 receives the downloaded weather report, the middleware layer 142 may be utilized to format the weather report for receipt and use by the set-top box 105.

According to one embodiment, data obtained and managed by the middleware layer 142 of the application server 140 is formatted according to the Extensible Markup Language and is passed to the set-top box 105 through the HFC network 115 where the XML-formatted data may be utilized by a client application 126 in concert with the middleware layer 124, as described above. As should be appreciated by those skilled in the art, a variety of third-party services data, including news data, weather data, sports data and other information content may be obtained by the application server 140 via distributed computing environments such as the Internet 144 for provision to customers via the HFC network 115 and the set-top box 105.

According to embodiments, swaps may be processed via the set-top box 105. Media devices such as tablets, PC, laptops, smart devices 106 and 107 are able to download the application to enable swap functionality with the set-top box 105. Each of these devices can be flexibly connected to the Internet 144 or to the service provider's HFC network solution 115. Personalized mosaic information is sent to a server 140. The server 140 will then be able to directly communicate with the devices 106 and 107, as well as with computer 180.

According to embodiments, the application server 140 obtains customer support services data, including billing data, information on customer work order status, answers to frequently asked questions, services provider contact information, and the like from data services 160 for provision to the customer via an interactive television session. As illustrated in FIG. 1, the services provider data services 160 include a number of services operated by the services provider of the CATV system 100 which may include data on a given customer.

A billing system 162 may include information such as a customer's name, street address, business identification number, Social Security number, credit history, and information regarding services and products subscribed to by the customer. According to embodiments, the billing system 162 may also include billing data for services and products subscribed to by the customer for bill processing billing presentment and payment receipt.

A customer information database 168 may include general information about customers such as place of employment, business address, business telephone number, and demographic information such as age, gender, educational level, and the like. The customer information database 168 may also include information on pending work orders for services or products ordered by the customer. The customer information database 168 may also include general customer information such as answers to frequently asked customer questions and contact information for various service provider offices/departments. As should be understood, this information may be stored in a variety of disparate databases operated by the cable services provider. In addition, an authentication system 166 may use data from billing system 162, customer information database 168, etc. to authenticate a subscriber.

Referring still to FIG. 1, web services system 150 is illustrated between the application server 140 and the data services 160. According to embodiments, web services system 150 serves as a collection point for data requested from each of the disparate data services systems comprising the data services 160 or from network storage 175. According to embodiments, when the application server 140 requires customer services data from one or more of the data services 160, the application server 140 passes a data query to the web services system 150. The web services system formulates a data query to each of the available data services systems for obtaining any required data for a requesting customer as identified by a set-top box identification associated with the customer. The web services system 150 serves as an abstraction layer between the various data services systems and the application server 140. That is, the application server 140 is not required to communicate with the disparate data services systems, nor is the application server 140 required to understand the data structures or data types utilized by the disparate data services systems. The web services system 150 is operative to communicate with each of the disparate data services systems for obtaining necessary customer data. The customer data obtained by the web services system is assembled and is returned to the application server 140 for ultimate processing via the middleware layer 142, as described above.

Figure 2:
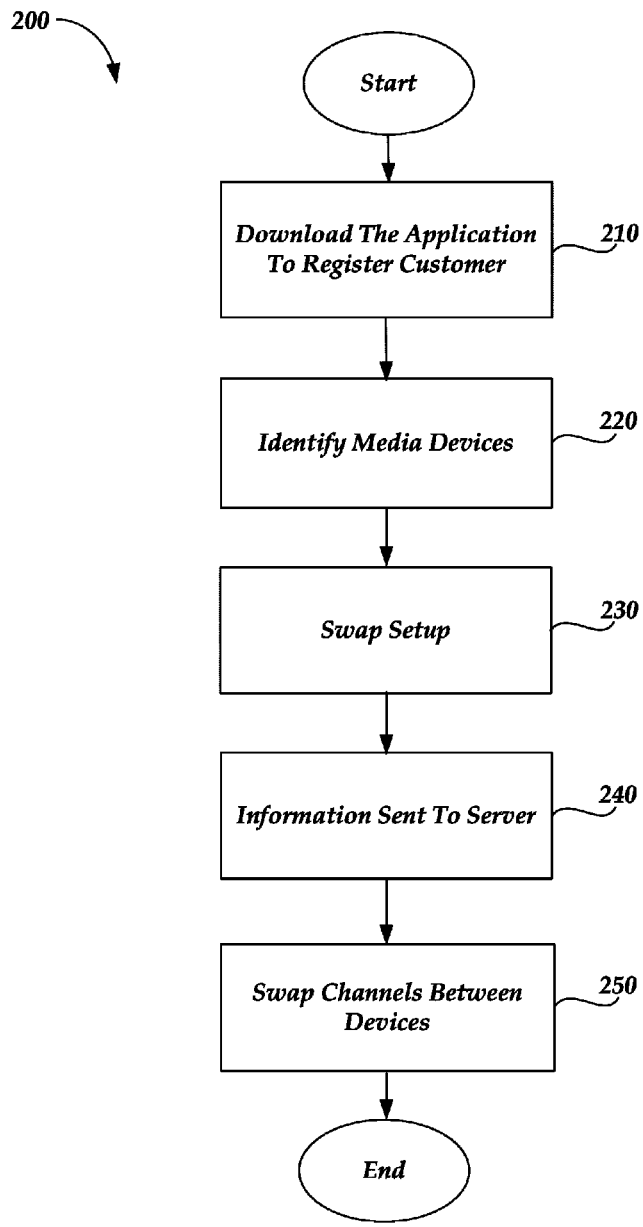
FIG. 2 is a block diagram of the high order process for tiling and swapping channels between a media device and a display device coupled to a set-top box according to one embodiment.

FIG. 2 is a block diagram 200 of the high order process for tiling and swapping channels between a media device and a display device coupled to a set-top box according to one embodiment. Mosaic is a cost-effective headend-based enhancement to the existing Interactive Program Guide that allows operators to provide video-rich, next generation guide channels. Using a tiled layout, a mosaic channel shows multiple thumbnails of high-quality live video streams on a single TV screen. The viewer uses the arrow buttons on their remote control to navigate and highlight individual tiles and hear the accompanying audio, and can directly tune to that channel if something captures their interest. Mosaic channels often group together similarly themed content to create audience-specific portals for News, Sports, Children's, Movie and local programming. Different mosaics may be setup and named based on customer preferences. When a mosaic is setup and named, the name distinguishes this setup for referencing. The mosaic then can be instructed to present a particular mosaic by name.

Embodiments allow customers to personalize their mosaic viewing experiences by tiling and swapping different channels between the TV and other media devices. The user is able to swap audio as well as video. Thus a program on the TV and a program on another supported device both have audio the user can listen to. Accordingly, embodiments enable the display of programs to move across devices. For mosaics, the customer may move one from a channel or a mosaic from a device to another device. The dimensions of tiling may be increased by not tiling on one device, but tiling on multiple devices and then swapping between these devices. Thus, the customer has multiple devices with multiple audios being received, and the customer moves the tiles to hear different audio. An application may be downloaded to the devices to provide the swapping functionality 210. Thus the user may download the application to register as a user 210, as well as the devices associated with the user 220 communicating this information back to the server. Swap setup information 230 including parameters to control the operation are defined via a user interface screen. So using UI the user can set the mosaic, name it, specify channels and personalize the setup by choosing programs to be mosaiced together. Thus, the customer can preset which device the mosaic is to be displayed on and may specify the number of channels to display on a certain device. Once the customer chooses the device(s) and what channels are to be displayed in the mosaics, this information is sent to the server 240. The user tiles or swaps channels according to their specifications 250.

Figure 3:
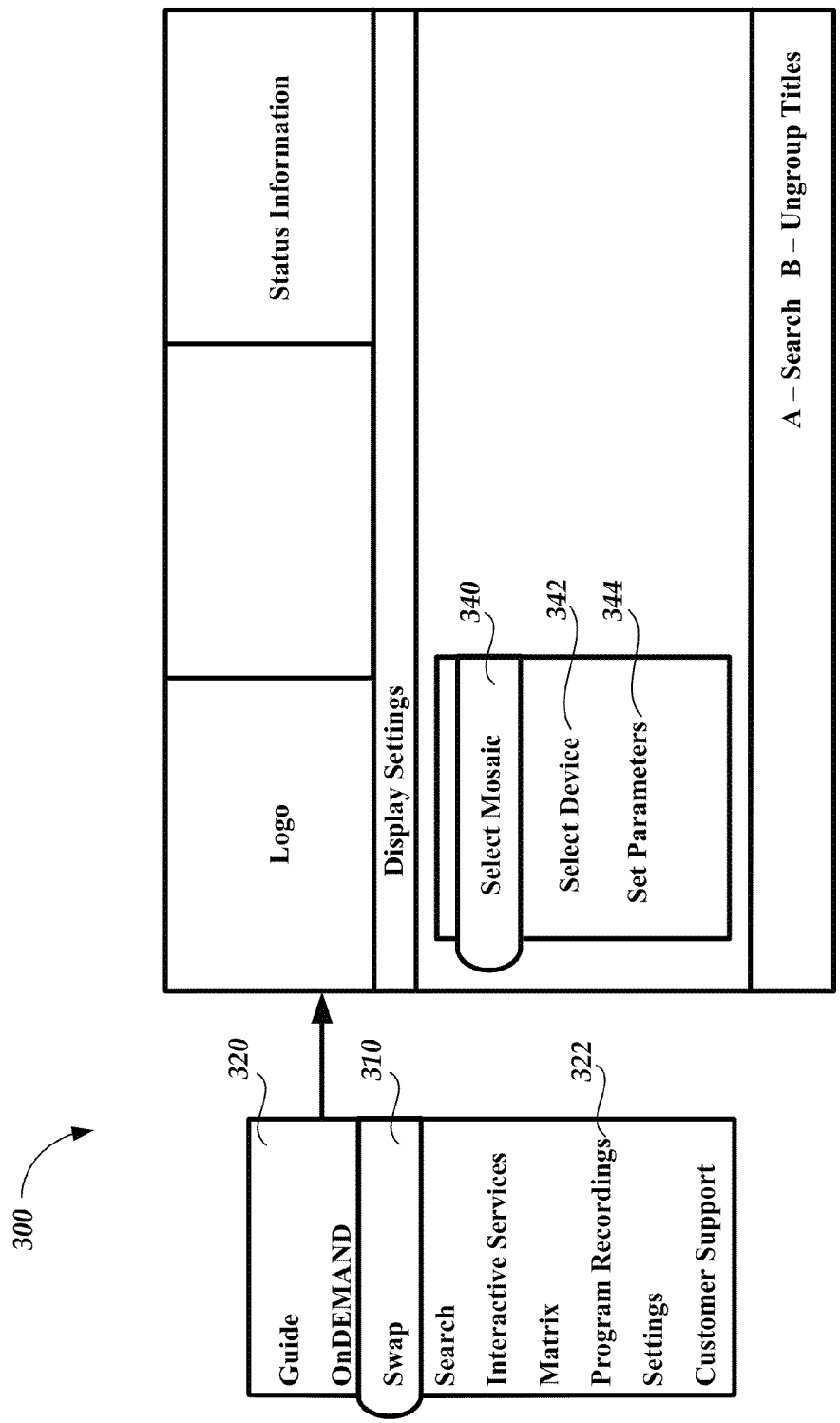
FIG. 3 is a simplified block diagram illustrating a user interface screen for the swap option settings according to one embodiment.

FIG. 3 is a simplified block diagram illustrating a user interface screen for the swap option settings 300 according to one embodiment. A user interface screen 300 enables the user to identify the devices for displaying the selected mosaics, and set parameters for controlling the operation. For example, the customer may select their tablet as the media device and then may switch the channel being displayed on the TV to the tablet, or move the channel on the tablet to the mosaic on the TV. A menu 320 is provided for the customer to select different functions. For example, the menu 320 allows a user to select programs for recording 322. The registered customer may further select the swap option 310 from the menu 320. The selection of the swap option 310 form menu 320 displays the settings associated with tiling and swapping channels between devices 340. The customer may configure a swap setup by setting swap configuration information using the set parameters option 344. Once the application is running on one of the customer's devices, the customer has the full functionality for the swap option 310. Settings associated with tiling and swapping channels between the device coupled to the STB and another media device include Select Mosaic 340, Select Device 342, and Set parameters 344.

The user can synchronize the favorite channels between the TV or the set-top box and the tablet devices. The user is able to navigate through these channels on the TV and the tablet device. One of the options is to navigate through all these favorites channels on the TV first and then on the tablet or allow the user to move one of these channels to watch on the tablet while scrolling through the channels on the TV. This will allow the user to swap channels to the tablet. Additionally, the customer is able to assign how the 'favorites' channels are displayed on the TV and the tablets. For example, the customer might choose the first 3 of 'favorites' channels shown on the TV and the rest shown on the Tablet.

Swapping channels between devices could occur because the tuners are busy, the user chooses to do the swap manually, or the channel to be swapped is one of the 'favorites' channels that are synchronized between the TV and the other devices (could be mobile devices).

Figure 4:
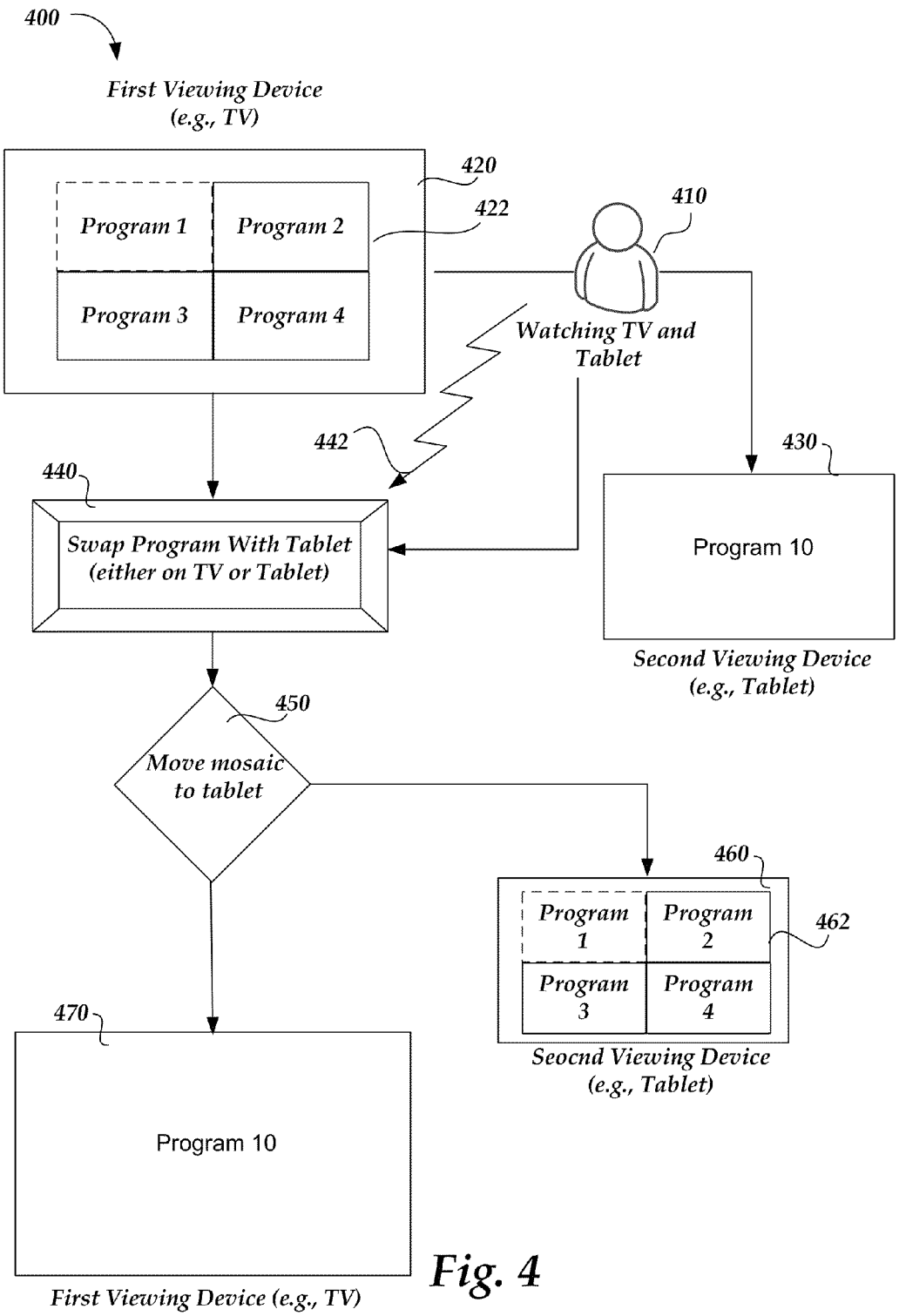
FIG. 4 is an illustrative routine of the process of mosaic swapping between TV and media device (tablet) according to one embodiment.

FIG. 4 is an illustrative routine 400 of the process of mosaic swapping between TV and media device (tablet) according to one embodiment. The user 410 may display a personalized mosaic on a first viewing device 420, e.g., a TV, and watch another program on a second viewing device 430, e.g., a tablet, computer or other media device. The user has the capability to swap the display of programs shown in the mosaic with the display on the tablet 440. The swap of the display of programs may include not only the swapping of video, but also the swapping of audio as configured on each device. The user triggers a swap initiation signal 442. For example, a button on the remote control, tablet or other device may be used for signaling to perform a swap 450. In FIG. 4, a mosaic is shown only on the TV 420. Instead of switching Program 10 and Program 3 so that the customer views Program 3 on the tablet, the user could switch 450 to watch the full screen of Program 10 on TV 470 and to display the mosaic on the tablet 460. The size of the mosaic is adjusted adaptively based on the size of the screen of the device and the number of channels that are chosen by the user. For example, the mosaic 422 displayed on viewing device 420 is larger than the mosaic 462 displayed on viewing device 460. Instead of swapping a full channel display and a mosaic as shown in FIG. 4, the same mosaic, including the same channels, may be displayed from one device to another. In addition, the mosaic may be swapped based on the settings/configuration of the other device, which means the mosaic functionality may be swapped to the other display, but the channels in the mosaic displayed on the other device might be different.

Figure 5:
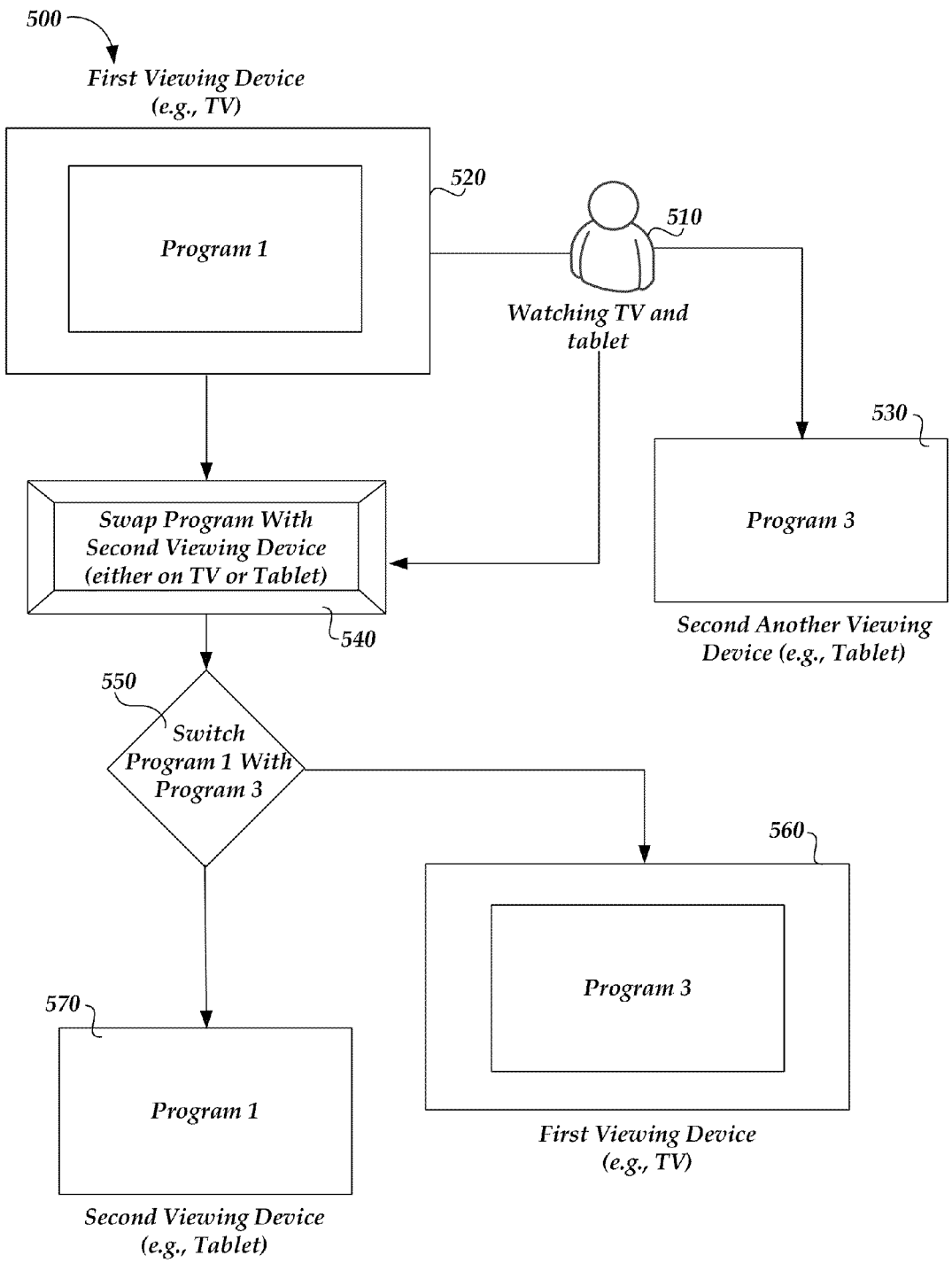
FIG. 5 is an illustrative routine of the process of swapping full screen programs between a tablet and TV according to one embodiment.

FIG. 5 is an illustrative routine 500 of the process of swapping full screen programs between a tablet and TV according to one embodiment. The user is able to swap the viewing of channels between the TV or display device 520 and other media devices 530. In FIG. 5, the user 510 is watching Program 1 on the TV 520 and Program 3 on the tablet device 530. The user is able to swap the viewing between these devices 540 enabling the user to watch Program 3 on the TV 560 and Program 1 on the tablet device 570. The swap button on the remote control, for example, can swap the viewing between the TV and the tablet device thus performing the switch of Program 1 and Program 3 550.

Additionally, if the user is recording multiple programs and chooses to watch a program on the tablet, the user will be able to swap the viewing from the TV to the tablet and continue the recording on the device. This will add another viewing outlet to other devices while the TV or the DVR is recording other programs. The user is able to swap viewing VOD, Linear video, and DVR content.

Figure 6:
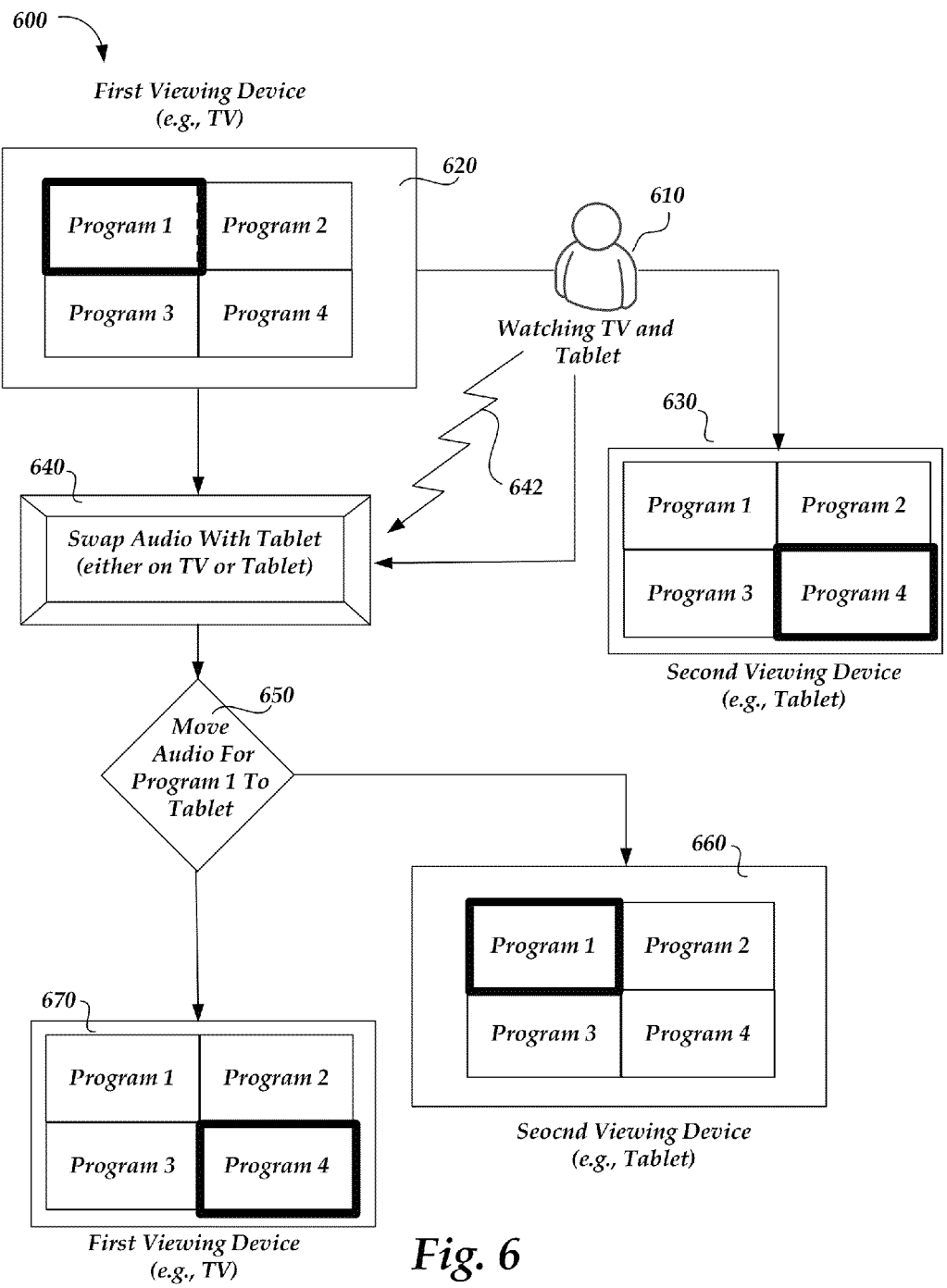
FIG. 6 illustrates the swapping of audio between devices according to an embodiment.

FIG. 6 illustrates the swapping of audio between devices 600 according to an embodiment. In FIG. 6, audio provided by the first viewing device 620, represented by box 680, is swapped with the audio provided by the second viewing device 630, represented by box 682. Thus, after the swap 650, the audio for Program 1 is provided on the second viewing device 660 and the audio of Program 4 is provided on the first viewing device 670. The swapping of audio may or may not be accompanied by a swap in video. Further, an indication, such as the color of a bounding box as shown in FIG. 6, may be provided to indicate the source of the audio being provided on each device.

Figure 7:
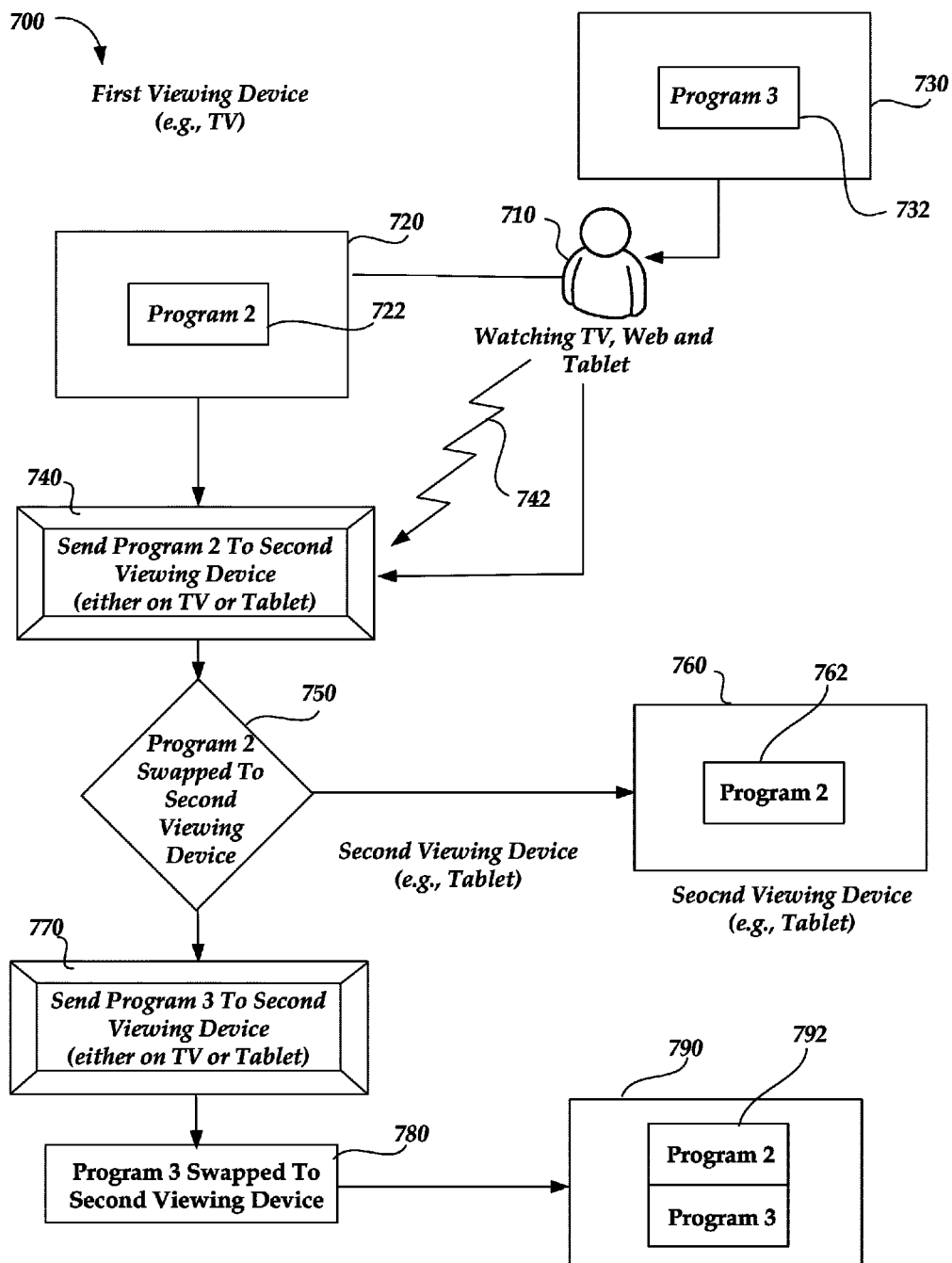
FIG. 7 illustrates the swapping of multiple channels from multiple devices to a single device according to an embodiment.

FIG. 7 illustrates the swapping of multiple channels from multiple devices to a single device 700 according to an embodiment. In FIG. 7, a user 710 is watching Program 2 722 on a first viewing device 720, e.g., a TV. The user 710 is also watching Program 3 732 on an Internet viewing device 730.

The user 710 selects to swap Program 2 722 to a third viewing device 760 via sending a control signal 742 to the first viewing device 720. Program 2 722 is swapped 750 to the third viewing device 760 and displayed as Program 2 762. In a similarly manner, the user thereafter selects 770 to send Program 3 732 on Internet viewing device 730 to the third viewing device 760. The user may have configured the third viewing device 760 to simply display Program 3 732. However, in FIG. 7, the user has configured the third viewing device to display sent programs as a mosaic. Thus, Program 3 is sent 780 to the third viewing device 790, wherein Program 2 and Program 3 are displayed in a mosaic 792.

Figure 8:
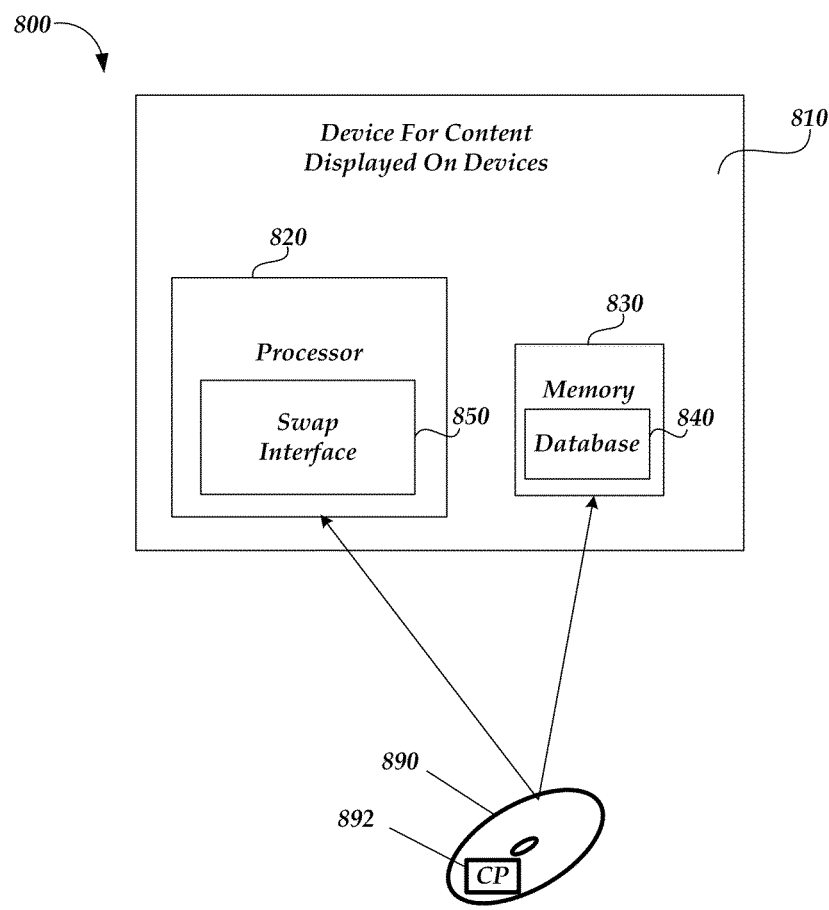
FIG. 8 illustrates a suitable computing environment for implementing a system as described above in FIGS. 1-7 according to an embodiment.

FIG. 8 illustrates a suitable computing environment 800 for implementing a system as described above in FIGS. 1-7 according to an embodiment. In FIG. 8, a device for tiling and swapping channels between a media device and a display device coupled to a set-top box 810 includes a processor 820 and memory 830. Those skilled in the art will recognize that the device for device for tiling and swapping channels between a media device and a display device coupled to a set-top box 810 may be implemented in a set-top box, a user component device, a head end module, a session resource manager, and other data/content control devices. Embodiments may also be implemented in combination with other types of computer systems and program modules. Generally, program modules include routines, programs, components, data structures, and other types of structures that perform particular tasks or implement particular abstract data types using processor 820.

By way of example, computer readable storage media 890 can include volatile and nonvolatile, removable and non-removable storage media implemented in any method or technology for storage of information 892, such as computer readable instructions, data structures, program modules, or other data. Moreover, those skilled in the art will appreciate that other computer system configurations may be implemented, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network.

Embodiments implemented on computer-readable storage media 890 may refer to a mass storage device, such as a hard disk or CD-ROM drive. However, it should be appreciated by those skilled in the art that tangible computer-readable media can be any available media that can be accessed or utilized by a processing device, e.g., server or communications network provider infrastructure. By way of example, and not limitation, computer-readable storage media 890 may include, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible medium which can be used to store the desired information and which can be accessed by a processing device.

As mentioned briefly above, a number of program modules and data files may be stored and arranged for controlling the operation of processing devices. Thus, one or more processing devices 820 may be configured to execute instructions that perform the operations of embodiments. For example, the processor 820 may access database 840 to tile and swap channels between a media device and a display device according to instructions stored in memory 830. Processor 820 is configured to provide a swap interface 850 that allows user to select channels to tile and swap between a media device and a display device according to instructions stored in memory 830. Those skilled in the art will also recognize the control of the tiling and swapping may be accomplished remote from a local device or a remote device that implements the swap interface 850.

It should also be appreciated that various embodiments can be implemented (1) as a sequence of computer implemented acts or program modules running on a processing device and/or (2) as interconnected machine logic circuits or circuit modules within the processing devices. The implementation is a matter of choice dependent on the performance requirements. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of embodiments as recited within the claims set forth herein.

Memory 830 thus may store the computer-executable instructions that, when executed by processor 820, cause the processor 820 to implement a device for tiling and swapping channels between a media device and a display device coupled to a set-top box according to an embodiment as described above with reference to FIGS. 1-7.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for swapping display configurations between viewing devices, comprising
    registering a user and viewing devices associated with the user;
    displaying a first display configuration on a first viewing device, the first display configuration being a personalized mosaic including a plurality of tiles each having first dimensions, the plurality of tiles including a first program and a second program, wherein the first viewing device provides audio of the first program and an indication that the audio of the first program is being provided;
    displaying a second display configuration on a second viewing device, the second display configuration being a second personalized mosaic including a plurality of tiles each having second dimensions, the plurality of tiles including the first program and the second program, wherein the second viewing device provides the audio of the second program and an indication that the audio of the second program is being provided;
    configuring a swap setup by setting swap configuration information;
    providing swap functionality to the registered viewing devices;
    receiving a swap initiation signal at the registered viewing devices;
    when the swap initiation relates to swapping the audio, swapping the audio of the first program on the first viewing device with the audio of the second program on a second viewing device, wherein the first viewing device is updated to indicate on the first display configuration that the audio of the second program is being provided and the second viewing device is updated to indicate on the second display configuration that the audio of the first program is being provided; and
    when the swap initiation relates to swapping the video, swapping display configurations between the registered viewing devices by swapping the first display configuration on the first viewing device with the second display configuration on a second viewing device so that the first display configuration is displayed on the second viewing device and the second display configuration is displayed on the first viewing device, wherein dimensions of one or more of the plurality of tiles of the personalized mosaic is increased by swapping the one or more of the plurality of tiles of the personalized mosaic of the first display configuration between the first and second viewing devices.

2. The method of claim 1, wherein the providing swap functionality to the registered viewing devices comprises downloading a swap application to a first viewing device and to a second viewing device to provide the swapping functionality between the first viewing device and the second viewing device.

3. The method of claim 1, wherein the configuring swap setup by setting swap configuration information further comprises setting parameters to control an operation defined via a user interface screen, to preset a viewing device for displaying a mosaic configuration, and to specify a number of channels to display on a viewing device.

4. The method of claim 3, wherein the setting parameters to control the operation defined via a user interface screen further comprises requesting provisioning of a mosaic configuration, naming the mosaic configuration, specify channels displayed in the mosaic configuration, and personalizing the setup of the mosaic configuration by choosing programs to be included in the mosaic configuration.

5. The method of claim 4 further comprising presenting the mosaic configuration in an interactive program guide using a tiled layout to show multiple thumbnails of video streams on a single screen.

6. The method of claim 5 further comprising highlighting a tile in the mosaic configuration to hear audio accompanying the highlighted tile.

7. The method of claim 5 further comprising highlight and selecting a tile in the mosaic configuration to directly tune to a channel associated with highlighted tile.

8. The method of claim 1, wherein the swapping display configurations between the registered viewing devices comprises swapping the audio between the first viewing device and the second viewing device and providing an indication of audio source on the first viewing device and on the second viewing device.

9. The method of claim 1, wherein the swapping display configurations between the registered viewing devices comprises swapping a mosaic configuration on the first viewing device with a display configuration on the second viewing device, wherein the size of the mosaic and the number of channels displayed in the mosaic is adjusted adaptively based on a size of a screen on the second viewing device and a number of channels chosen by a user.

10. The method of claim 1, wherein the swapping display configurations between the registered viewing devices comprises swapping a first channel to the second viewing device and thereafter swapping a second channel to the second viewing device, wherein the first channel and the second channel are displayed mosaicly on the second viewing device upon the swap of the second channel to the second viewing device.

11. The method of claim 1, wherein the first display configuration and the second display configuration are both full screen programs.

12. The method of claim 1, wherein the swapping display configurations between the registered viewing devices comprises:
    displaying a personalized mosaic configuration on a first viewing device;
    displaying a single program on a second viewing device; and
    causing the personalized mosaic configuration to be displayed on the second viewing device and the single program to be displayed on the first viewing device.

13. The method of claim 1 further comprising:
    setting up the recording of multiple programs via a first viewing device;
    choosing to watch a program by swapping the viewing of the program from display on the first viewing device to display on the second viewing device; and
    continuing to record the multiple programs displayed on the first viewing device.

14. The method of claim 1 further comprising communicating the registration and swap configuration information to a server at a headend.

15. The method of claim 1, wherein the swapping display configurations between the registered viewing devices comprises causing a display of programs to move across viewing devices.

16. A system for swapping display configurations between viewing devices, comprising:
    memory for storing data;
    a processor, coupled to the memory, the processor implementing a user interface screen, the user interface screen being presented to a user for registering a user and the viewing devices associated with the user, displaying a first display configuration on a first viewing device, the first display configuration is a personalized mosaic including a plurality of tiles each having first dimensions, the plurality of tiles including a first program and a second program, wherein the first viewing device provides audio of the first program and an indication that the audio of the first program is being provided, displaying a second display configuration on a second viewing device, the second display configuration is a second personalized mosaic including a plurality of tiles each having second dimensions, the plurality of tiles including the first program and the second program, wherein the second viewing device provides the audio of the second program and an indication that the audio of the second program is being provided, selecting viewing devices from the registered viewing devices of the user for associating swap functions thereto, setting a display configuration for the selected viewing devices, and configuring a swap setup by setting swap configuration information, wherein when the swap initiation relates to swapping the audio, swapping the audio of the first program on the first viewing device with the audio of the second program on a second viewing device, wherein the first viewing device is updated to indicate that the audio of the second program is being provided and the second viewing device is updated to indicate that the audio of the first program is being provided, and wherein when the swap initiation relates to swapping the programming, swapping the first display configuration on the first viewing device with the second display configuration on a second viewing device so that the first display configuration is displayed on the second viewing device and the second display configuration is displayed on the first viewing device, wherein dimensions of one or more of the plurality of tiles of the personalized mosaic is increased by swapping the one or more of the plurality of tiles of the personalized mosaic of the first display configuration between the first and second viewing devices.

17. The system of claim 16, wherein the processor receives a swap initiation signal and swaps display configurations between the selected viewing devices.

18. The system of claim 16, wherein the processor configures swap setup by setting parameters to control an operation defined via the user interface screen, to preset at least one of the selected viewing devices for displaying a mosaic configuration, and to specify a number of channels to display in the mosaic configuration on the preset at least one of the selected viewing devices.

19. The system of claim 16, wherein the user interface screen provides provisioning of a mosaic configuration, naming the mosaic configuration, specifying of channels displayed in the mosaic configuration, and personalizing the setup of the mosaic configuration by choosing programs to be included in the mosaic configuration.

20. The system of claim 16, wherein the processor swaps display configurations between the selected viewing devices by swapping the audio between a first viewing device and a second viewing device and providing an indication of audio source on the first viewing device and on the second viewing device.

21. The system of claim 16, wherein the processor swaps display configurations between the selected viewing devices by swapping a mosaic configuration on a first viewing device with a display configuration on a second viewing device, wherein the size of the mosaic and the number of channels displayed in the mosaic is adjusted adaptively based on a size of a screen on the second viewing device and a number of channels chosen by a user.

22. The system of claim 16, wherein the processor swaps display configurations between the selected viewing devices by swapping a first channel to a second viewing device and thereafter swapping a second channel to a second viewing device, wherein the first channel and the second channel are displayed mosaicly on the second viewing device upon the swap of the second channel to the second viewing device.

23. The system of claim 16, wherein the first display configuration and the second display configuration are both full screen programs.

24. The system of claim 16, wherein the first display configuration is a personalized mosaic configuration and the second display configuration is a full screen program configuration.

25. The system of claim 16, wherein the user interface screen provides an option for setting up recording of multiple programs via a first viewing device and an option for by swapping the viewing of a program from display on the first viewing device to display on the second viewing device when a user chooses to watch a program via the user interface screen, wherein the programs selected for recording continue to be recorded and displayed on the first viewing device.

26. A non-transitory computer-readable memory including executable instructions which, when executed by a processor, provides for swapping display configurations between viewing devices, by:
   registering a user and viewing devices associated with the user;
   displaying a first configuration on a first viewing device, the first configuration is a first personalized mosaic including a plurality of tiles each having first dimensions, the plurality of tiles including a first program and a second program, wherein the first viewing device provides audio of the first program and an indication that the audio of the first program is being provided;
   displaying a second configuration on a second viewing device, the second configuration is a second personalized mosaic including a plurality of tiles each having second dimensions, the plurality of tiles including the first program and the second program, wherein the second viewing device provides the audio of the second program and an indication that the audio of the second program is being provided;
   providing swap functionality to the registered viewing devices;
   receiving swap initiation at the registered viewing devices; and
   when the swap initiation relates to swapping the audio, swapping the audio of the first program on the first viewing device with the audio of the second program on a second viewing device, wherein the first viewing device is updated to indicate that the audio of the second program is being provided and the second viewing device is updated to indicate that the audio of the first program is being provided.

27. The non-transitory computer-readable memory of claim 26, further comprising when the swap initiation signal is for the display configurations, swapping display configurations between the registered viewing devices by swapping the first display configuration on the first viewing device with the second display configuration on a second viewing device so that the first display configuration is displayed on the second viewing device and the second display configuration is displayed on the first viewing device, wherein dimensions of one or more of the plurality of tiles of the personalized mosaic is increased by swapping the one or more of the plurality of tiles of the personalized mosaic of the first display configuration between the first and second viewing devices.

28. The non-transitory computer-readable memory of claim 26, wherein the processor receives a swap initiation signal and swaps display configurations between the selected viewing devices.

29. The non-transitory computer-readable memory of claim 26, wherein the processor configures swap setup by setting parameters to control an operation defined via the user interface screen, to preset at least one of the selected viewing devices for displaying a mosaic configuration, and to specify a number of channels to display in the mosaic configuration on the preset at least one of the selected viewing devices.

30. The non-transitory computer-readable memory of claim 26, wherein the user interface screen provides provisioning of a mosaic configuration, naming the mosaic configuration, specifying of channels displayed in the mosaic configuration, and personalizing the setup of the mosaic configuration by choosing programs to be included in the mosaic configuration.

\* \* \* \* \*

UNITED STATES PATENT AND TRADEMARK OFFICE
CERTIFICATE OF CORRECTION

PATENT NO.       : 8,789,126 B1
APPLICATION NO.  : 13/221063
DATED            : July 22, 2014
INVENTOR(S)      : Nijim et al.

It is certified that error appears in the above-identified patent and that said Letters Patent is hereby corrected as shown below:

In the Specification

Col. 1, line 39: "on the W. It allows" should read --on the TV. It allows--

Signed and Sealed this
Sixth Day of January, 2015

Michelle K. Lee
*Deputy Director of the United States Patent and Trademark Office*